July 7, 1970 U. LIMONI 3,519,209

NOZZLE APPARATUS

Filed Sept. 27, 1968

INVENTOR.
URI LIMONI
BY
Davis, Hoxie, Faithfull & Hapgood
ATTORNEYS

United States Patent Office 3,519,209
Patented July 7, 1970

3,519,209
NOZZLE APPARATUS
Uri Limoni, Lincoln Park, N.J., assignor to Blazer Corporation, East Rutherford, N.J., a corporation of New Jersey
Filed Sept. 27, 1968, Ser. No. 763,197
Int. Cl. B05b 1/34
U.S. Cl. 239—468                                         3 Claims

ABSTRACT OF THE DISCLOSURE

A nozzle for fluid distribution systems is formed of a resilient material, and includes an expanded end portion and a truncated rib portion for securing the nozzle in a desired spatial relationship on a fluid conduit. The resilient nature of the composite nozzle renders it adaptable for cleaning in situ.

DISCLOSURE OF INVENTION

Figure 1:
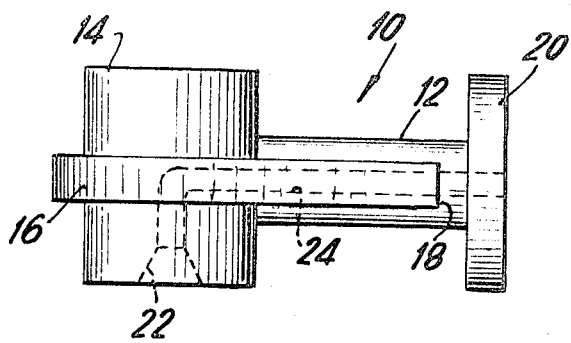

This invention relates to a fluid distribution system and, more specifically, to an improved spray nozzle for use in heat exchanging systems.

Evaporative heat exchanging apparatus for cooling a flowing heated liquid with a counter flowing air stream have been widely employed. For example, in cooling tower arrangements, apparatus is employed to spray heated water or the like into the tower, with the heated fluid falling downward under the action of gravity. A fan or other blowing apparatus draws or blows a counter air flow upward through the tower. The moving air stream evaporates a portion of the falling fluid stream, thus removing a quantum of energy given by the heat of vaporization for the evaporated liquid from the remaining fluid which is thus cooled. Accordingly, the fluid collected on the bottom exhibits a lower temperature than the fluid entering the tower.

Similarly, in so-called evaporative condenser heat exchangers, the fluid to be cooled flows through a conduit traversing across a chamber, with counter air and water flows being present as in the cooling tower arrangement. For these evaporative heat exchangers, heat energy required to vaporize a portion of the falling fluid is similarly extracted from the contents of the conduit, which contents are thereby cooled.

Fabrication of the water or other fluid distribution system for the cooling tower or evaporative heat exchangers, and the liquid spraying apparatus in particular, has been relatively time consuming and therefore expensive. More specifically, metallic spray nozzles have illustratively been threaded and screwed into fluid conveying branch conduits which must therefore be drilled and tapped. Alternatively, a brazing or welding operation has been employed.

In addition to the expense directly associated with the nozzle attaching operation, such a threaded attachment also requires that the branch conduits be of thickness which exceeds that required to convey the fluid or to support the weight of the nozzles. Thus, the material cost for the header and branch conduits has been relatively large.

Moreover, cleaning of the nozzles has been relatively time consuming for the threaded situation since the individual nozzles must be unscrewed and removed from service, cleaned, and rescrewed into place. Obviously, cleaning is very difficult for the brazed or welded situation.

Further, unlike existing nozzle attaching methods, it is desirable that the nozzles lock into place such that the exit orifices thereof are directed straight down. Where, as in prior art nozzle mounting arrangements, the nozzles are subject to misalignment, the resulting downward water flow is not homogeneous across the cross section of the heat exchanging chamber. Accordingly, when such a misalignment condition obtains, maximum heat transfer does not take place between the counter water and air flows.

It is thus an object of the present invention to provide an improved water distribution arrangement.

More specifically, an object of the present invention is the provision of an improved fluid spraying nozzle which is readily attachable to a fluid conduit; which is securable in a predetermined spatial relationship with the conduit; and which may be cleaned in situ, i.e., without being removed from the fluid conduit.

The above and other objects of the present invention are realized in an illustrative nozzle apparatus which is formed of a pliable, resilient material such as rubber. The nozzle comprises a cylindrical extension portion adapted to fit in a like-shaped hole in a liquid branch conduit. An expanded disc element is included at one end of the extension portion and disposed within the conduit when the nozzle is in place. The disc-shaped nozzle portion prevents the nozzle from moving away from the conduit when the nozzle is in service, and also cooperates with the fluid pressure to effect a sealing function.

A main nozzle body portion is attached to the extension portion and contains an exit orifice for the fluid. The orifice is connected by a hollow passageway through the main and nozzle extension portions to the interior of the fluid conduit.

A rib is included about the nozzle body and extension portion, with the rib being disposed perpendicular to the axis of the exit orifice. The rib terminates in a like pair of flat surfaces which cooperate with the exterior conduit surface to permit rapid attachment of the nozzle to the conduit and, after the nozzle has been rotated approximately ninety degrees, securing the nozzle such that the nozzle orifice is oriented straight downward.

Should waste or dirt particles become lodged in the fluid passageway, the nozzle may be cleaned by squeezing and manipulating the extension and main body portions thereof while the device remains in place on the conduit.

Figure 2:
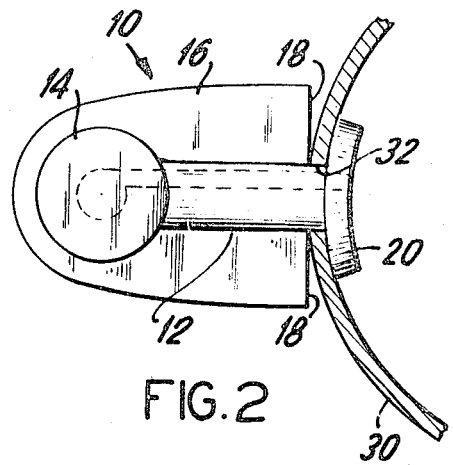
Figure 1A:
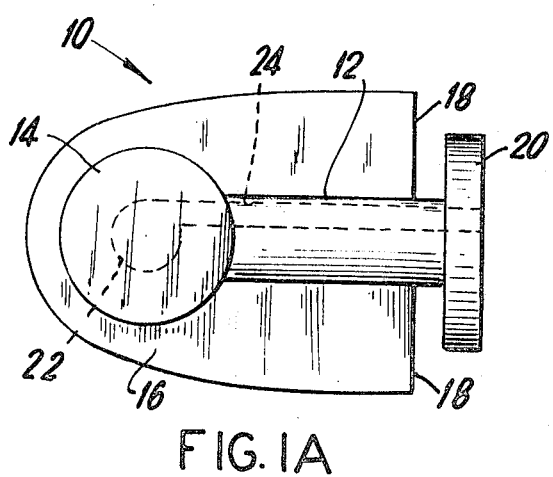
Figure 3:
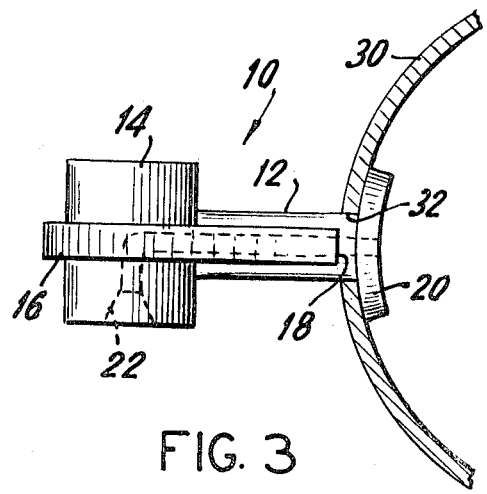
Figure 3A:
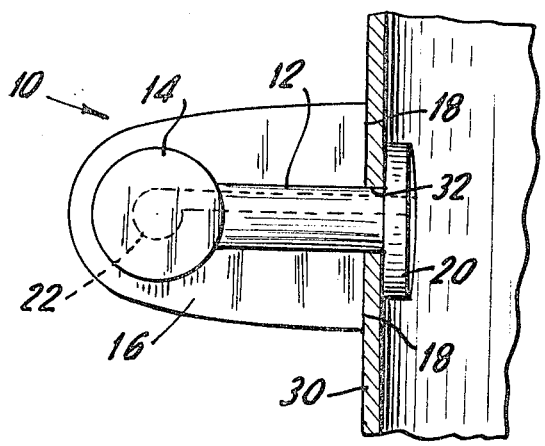

The above and other features and advantages of the present invention are realized in a specific illustrative embodiment thereof presented hereinbelow in conjunction with the accompanying drawing in which:

FIGS. 1 and 1A comprise side and top plan views of an improved nozzle 10 embodying the principles of the present invention;

FIG. 2 depicts the nozzle 10 in plan view, and a conduit 30 in transverse section during an initial installation operation; and FIGS. 3 and 3A respectively depict a nozzle 10 in side and top plan views and the conduit 30 in section, after nozzle installation has been completed.

Referring now to FIGS. 1 and 2, there is shown an improved nozzle 10 adapted for use as a fluid spray element for cooling towers, evaporative heat exchangers or the like. The nozzle 10 is molded or otherwise formed of a resilient material such as rubber and includes an extension portion 12 having a cross sectional geometry and size conforming to a hole in a fluid conduit (e.g., a hole 32 in a conduit 30 depicted in FIGS. 2, 3 and 3A).

An expanded, e.g., disc-shaped nozzle portion 20 is disposed on one end of the extension portion 12, with the other end of the portion 12 terminating at a main nozzle portion 14. A fluid exiting spray orifice 22 is included at the bottom of the body portion 14 and connected in an eccentric manner by a hollow passageway 24 to the end of the expanded disc portion 20. Disposed about the main and extension nozzle portions 14 and 12 is a rib-like element 16 which terminates in two planar surfaces 18. The spacing between the surfaces 18 and the side of the disc portion 20 nearest thereto is adapted to correspond to the thickness of the conduit which is to receive the nozzle. The rib 16 reinforces the composite nozzle 10 and, moreover, the surfaces 18 thereof effect orientation determining and locking functions as described more fully hereinbelow.

To insert the nozzle 10 in a conduit, e.g., a horizontally positioned pipe 30 having a nozzle receiving aperture 32, the nozzle is oriented as illustrated in FIG. 2 such that the rib surfaces 18 do not substantially contact or engage the exterior surface of the pipe. The pliable disc section 20 is next locally compressed and worked into the interior of the pipe 30.

The nozzle 10 is then rotated approximately ninety degrees to its final position as shown in FIGS. 3 and 3A with the fluid exiting orifice 22 being directed to the desired downward orientation. In this final position, and only in this final position, the surfaces 18 enter into an interfering frictional engagement with the periphery of the pipe 30, thereby securing the nozzle 10 into the desired spatial relationship with the pipe such that water exiting from the orifice 22 flows directly downward for a maximum heat transfer interaction with the counter air flow.

After all desired nozzles 10 have been seated in a heat exchanging system in the manner illustrated in FIGS. 2, 3 and 3A, the heated fluid is supplied to the conduit 30, and flows under pressure through the passageway 24 in each nozzle 10 and out of the nozzle orifice 22 for heat exchanging exposure. The fluid pressure acts against the back of the expanded nozzle disc portions 20 forcing them against the inner periphery of the tube 30 thus creating an effective seal and permitting fluid to pass only through the nozzle passageways and orifices 24–22.

The nozzles 10 may be periodically purged of foreign substances which lodge therein by simply squeezing them while they remain in place on the pipes. Large particles which accumulate in the passageway 24 can be worked free to pass out of the orifices 22 and smaller waste or mineral collection can be expelled by rubbing opposite sides of the passageway together.

Thus, the nozzle 10 has been shown by the above to be readily insertable into a conduit such as employed in evaporative heat exchangers, to automatically and securely attain a desired spatial orientation on the conduit; and to be capable of being cleaned in situ.

The above-described features and advantages are only illustrative of the principles of the present invention. Numerous modifications and adaptations thereof may be readily devised by those skilled in the art without departing from the spirit and scope of the present invention.

What is claimed is:

1. A unitary nozzle adapted for insertion in an aperture in a fluid conduit included in an evaporative heat exchanging apparatus comprising an extension portion for passing through the aperture in the fluid conduit, an expanded portion larger than the conduit aperture affixed to said extension portion, a main body portion affixed to said extension portion, a fluid exit orifice included in said main body portion, a fluid passageway connected to said orifice and passing through said nozzle main body, extension, and expanded portions, rib means included on said nozzle extension portion and including at least one surface for selectively frictionally engaging the pipe means only when said nozzle is disposed in a predetermined orientation within and relative to the conduit at least said expanded portion being formed of a resilient or pliant material.

2. A combination as in claim 1 wherein the entire nozzle is formed of a resilient material.

3. A combination as in claim 1 wherein said fluid passageway is eccentrically connected to said orifice.

References Cited

UNITED STATES PATENTS

| 501,178 | 7/1893 | Bourdil | 239—469 |
| 2,247,897 | 7/1941 | Wahlin | 239—469 |
| 2,563,300 | 8/1951 | Aker | 239—547 |
| 3,198,441 | 8/1965 | Facius | 239—550 |
| 3,240,434 | 3/1966 | Bradley | 239—550 |

EVERETT W. KIRBY, Primary Examiner

U.S. Cl. X.R.

239—547, 550, 602